Nov. 20, 1951 — C. PAYNE — 2,575,561

PICKUP IMPLEMENT

Filed March 14, 1946

Claude Payne
INVENTOR.

ATTORNEY.

Patented Nov. 20, 1951

2,575,561

UNITED STATES PATENT OFFICE 2,575,561

PICKUP IMPLEMENT

Claude Payne, Bicknell, Ind.

Application March 14, 1946, Serial No. 654,268

1 Claim. (Cl. 294—50.6)

This invention relates to an implement designed for use in removing papers or other foreign matter from lawns, roadways or the like, the primary object of the invention being to provide an implement of this character having means at one of its ends for gripping the article to be removed, the gripping means being operated by a rod extending to a point adjacent to the handle of the implement where it may be readily gripped by the fingers of the hand holding the implement, leaving the other hand free.

With the foregoing and other objects in view which will appear as the description proceeds, the invention consists of certain novel details of construction and combinations of parts, hereinafter more fully described and pointed out in the claim, it being understood that changes may be made in the construction and arrangement of parts without departing from the spirit of the invention as claimed.

Referring to the drawing.

Figure 1:
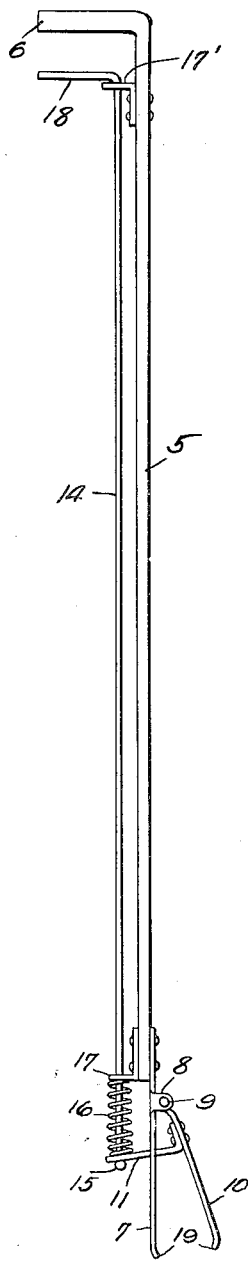
Figure 1 is an elevational view of a pick-up implement constructed in accordance with the invention.
Figure 2:
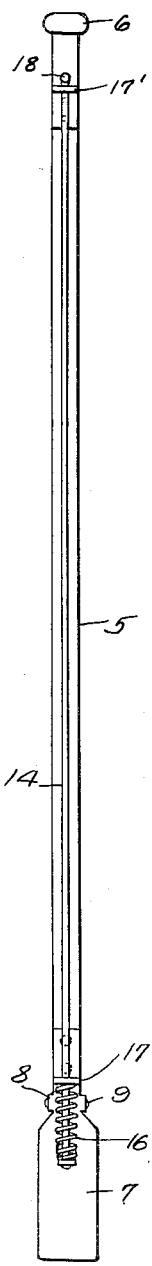
Figure 2 is a front elevational view thereof.
Figure 3:
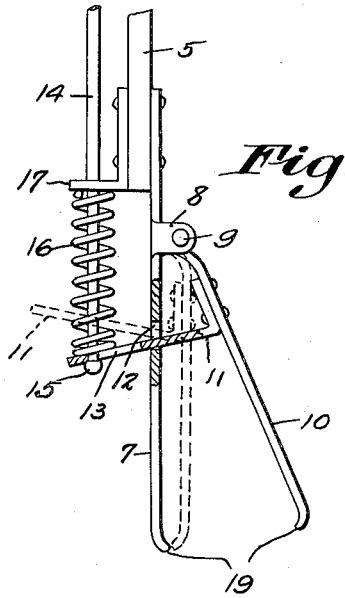
Figure 3 is an enlarged side elevational view illustrating the jaws of the implement, as in their open positions.
Figure 4:
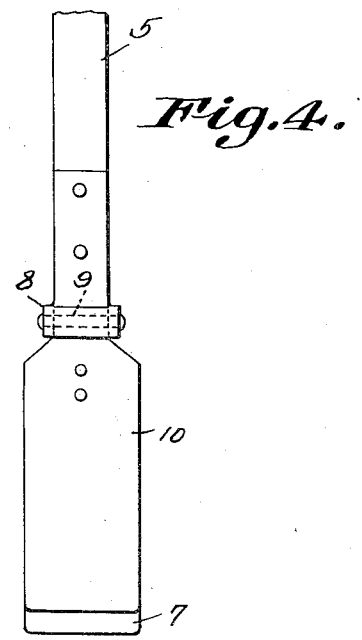
Figure 4 is an enlarged elevational view of the jaws.

Referring to the drawing in detail, the implement comprises a body portion 5, which may be in the form of a stick or the like having a handle 6 formed at one end thereof, the handle extending at right-angles with respect to the body portion.

At the opposite end of the body portion is a wide flat stationary jaw 7 which is provided with parallel laterally extended ears 8 which are apertured to receive the pivot pin 9 on which the pivot jaw 10 is mounted. Extending from the pivoted jaw 10 is an arm 11 which passes through an opening 12 formed in the stationary jaw 7, the arm 11 being provided with an elongated opening 13 in which the lower end of the rod 14 is disposed. A ball 15 is formed on the lower end of the rod 14 and secures the rod 14 within the opening 13 in such a way that sliding movement of the rod 14, with respect to the arm 11, will be permitted.

The reference character 16 indicates a coiled spring which is disposed between the bracket 17 secured to the body portion 5, and the arm 11, so that the spring normally acts to urge the pivoted jaw 10 away from the stationary jaw 7.

The upper end of the rod 14 extends through an opening in the bracket 17', where it is provided with a handle 18 disposed at right angles with respect to the rod 14, the handle 18 being parallel with the handle 6, so that it may be readily gripped by fingers of the hand holding the implement.

The free ends of the jaws are turned inwardly as at 19, so that they will readily grip an article over which the jaws are positioned, when the pivoted jaw swings into gripping relation with the stationary jaw.

From the foregoing it will be seen that due to the construction shown and described, I have provided a pick-up implement which may be readily operated to pick up articles such as paper or the like, while the person using the implement stands in upright position.

What is claimed is:

An implement of the class described, comprising a body portion including a handle, a wide stationary jaw mounted at one end of the handle, said stationary jaw having an opening formed near the inner end thereof, a jaw pivotally mounted on the stationary jaw, a laterally extended arm having one of its side faces disposed towards said handle, secured to the pivoted jaw, adjacent to the pivot of said jaw, said arm extending through the opening of the stationary jaw, said arm having an elongated opening, elongated longitudinally of the arm, an operating rod slidably monted on the body portion, a ball secured to one end of the rod, one end of the operating rod being disposed within the elongated opening of the arm, said ball restricting movement of the rod with respect to the arm in one direction, a coiled expansible spring mounted on the rod and engaging the arm, a bracket extending from the body portion against which the opposite end of the spring engages, said spring normally urging the arm and pivoted jaw outwardly, said rod being movable against the action of the spring closing the jaws, and a handle on the rod by means of which the rod is operated.

CLAUDE PAYNE.

REFERENCES CITED

The following references are of record in the file of this patent:

UNITED STATES PATENTS

| Number | Name | Date |
|---|---|---|
| 872,260 | Shank | Nov. 26, 1907 |
| 1,244,344 | Leaman | Oct. 23, 1917 |
| 1,731,764 | Coffin | Oct. 15, 1929 |
| 1,908,322 | Cook | May 9, 1933 |
| 1,979,432 | Zander | Nov. 6, 1934 |
| 2,373,872 | Couture | Apr. 17, 1945 |